(12) United States Patent
Chikura et al.

(10) Patent No.: US 7,198,719 B2
(45) Date of Patent: Apr. 3, 2007

(54) SEALER HOLDING MEMBER FOR MEMBRANE ELEMENT AND MEMBRANE ELEMENT USING THE SAME

(75) Inventors: Shinichi Chikura, Ibaraki (JP); Yasuhiro Uda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 11/203,949

(22) Filed: Aug. 15, 2005

(65) Prior Publication Data

US 2006/0049093 A1    Mar. 9, 2006

(30) Foreign Application Priority Data

Sep. 3, 2004    (JP)    ............... 2004-257168

(51) Int. Cl.
*B01D 63/10*    (2006.01)
*B01D 65/00*    (2006.01)
*B01D 69/00*    (2006.01)
*F16J 15/02*    (2006.01)

(52) U.S. Cl. ............ 210/321.83; 210/232; 210/321.74; 210/497.1; 277/549

(58) Field of Classification Search ................ 210/232, 210/321.6, 321.72, 321.74, 321.76, 321.83, 210/321.85, 497.1; 277/530, 549, 560, 562, 277/567

See application file for complete search history.

(56) References Cited

U.S. PATENT DOCUMENTS 4,698,154 A * 10/1987 Mohn et al. ................. 210/232
5,108,604 A * 4/1992 Robbins ................. 210/321.74
6,224,767 B1 * 5/2001 Fujiwara et al. ......... 210/323.1
6,632,356 B2   10/2003 Hallan et al.
2005/0057002 A1 * 3/2005 Chikura et al. ............. 277/549

FOREIGN PATENT DOCUMENTS

| JP | 11-20715 A | 1/1999 |
| JP | 11-76757 A | 3/1999 |
| JP | 11-267468 A | 10/1999 |
| JP | 11-267470 A | 10/1999 |
| JP | 2000-93761 A | 4/2000 |
| JP | 2000-354742 A | 12/2000 |
| JP | 2004-536703 A | 12/2004 |
| JP | 2005-111473 A | 4/2005 |

* cited by examiner

*Primary Examiner*—John Kim
(74) *Attorney, Agent, or Firm*—Knobbe Martens Olson & Bear LLP

(57) ABSTRACT

A sealer holding member for a membrane element is disposed at an end of a spiral-type membrane element on an outer circumference thereof, and allows a feed to flow into a membrane end of the membrane element. The sealer holding member includes a first annular portion, an annular projection, a second annular portion, and a third annular portion arranged in this order. The first annular portion is engaged with an outer-covering member for the membrane element and receives an end of the membrane element without contacting a side of the membrane element. The second annular portion receives a sealer on an outside thereof.

26 Claims, 6 Drawing Sheets

006
SEALER HOLDING MEMBER FOR MEMBRANE ELEMENT AND MEMBRANE ELEMENT USING THE SAME

BACKGROUND OF THE INVENTION

1. Field of the Invention

The present invention relates to a sealer holding member for holding a sealer that shuts off the gap between a spiral-type membrane element and a vessel as well as a membrane element using the same. More particularly, the present invention relates to a sealer holding member capable of increasing the charged amount of the membrane (membrane leaves) of the membrane element as compared with a conventional one, as well as a membrane element using the same.

2. Description of the Related Art

Figure 9:
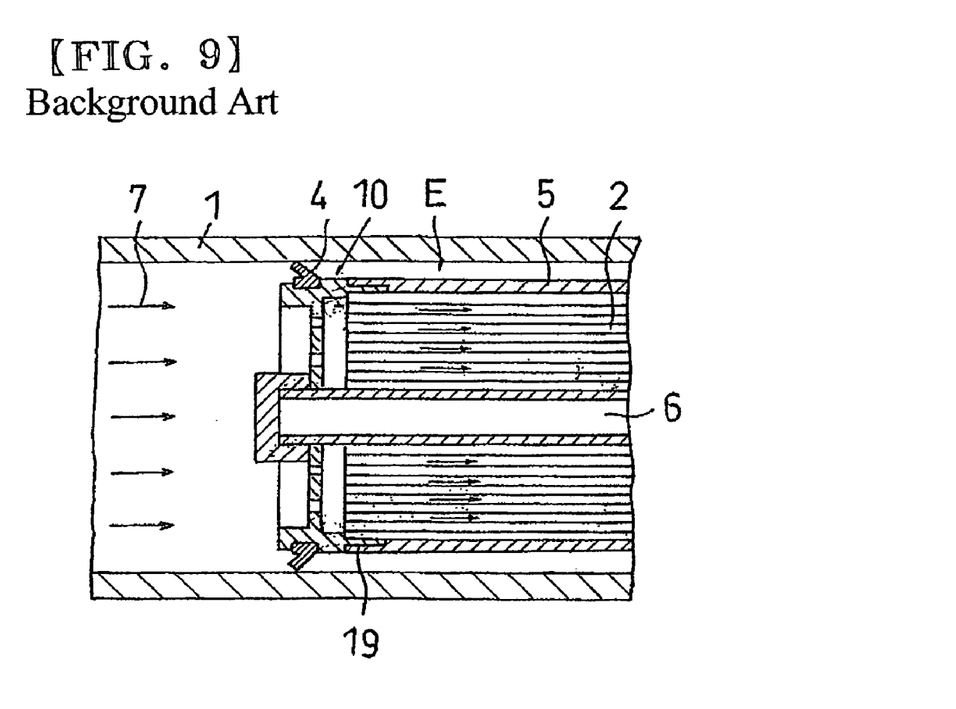
FIG. 9 is a partial cross-sectional view illustrating an example of an attachment state of a conventional sealer holding member for a membrane element.

From the past, a spiral-type separation membrane module is used for a variety of uses such as desalting of brine or sea water, production of ultrapure water, and processing of waste water. Referring to FIG. 9, a spiral-type separation membrane module has a structure such that a spiral-type separation membrane element E is housed in a pressure vessel 1, and the gap between the vessel 1 and the element E is shut off with an annular sealer 4 so as to allow a supplied feed 7 to flow efficiently into the element E. The feed that has flown into the element E is separated by a separation membrane while flowing toward the downstream side along the supply-side spacer of the element E. The permeate that has been permeated through the separation membrane flows along the permeation-side spacer and is collected into a water-collection tube 6. The membrane part of the element E is constructed with a wound body 2 of membrane leaves made of a lamination of the supply-side spacer, the separation membrane, and the permeation-side spacer.

FIG. 9 illustrates a state of an end portion when the vessel 1 is loaded with the element E and the feed 7 is supplied. The module has a mechanism such that the supplied feed 7 is shut off from the outside of the element E by the sealer 4, so that the total amount of the feed 7 flows into the inside of the element E. The module includes a sealer holding member 10 for holding the sealer 4 on the element E.

The aforesaid sealer 4 is held by the sealer holding member 10 that is attached to an end of the element E. Also, the sealer 4 is made of rubber or the like having a U-shaped or V-shaped cross section, and widens and extends toward the outside by a pressure at the time of receiving a water stream. In this state, the sealer 4 seals the gap between the element E and the vessel 1 (See, for example, Japanese Laid-open Patent Publication No. 11-76757/1999).

The sealer holding member 10 generally has a cylindrical portion 19 (skirt) for fitting an end of the wound body 2 constituting the membrane part, and has a structure such that an outer-covering member 5 of the element E can be fitted and bonded to the outer circumference of this cylindrical portion 19 (See, for example, Japanese Laid-open Patent Publication No. 2000-354742). However, with the structure such that the wound body 2 is fitted into the inside of the cylindrical portion 19, the diameter of the wound body 2 is limited, and there is a limit imposed upon the increase of the membrane area. Also, since the width of the wound body 2 in the axial direction is limited by the thickness of the sealer holding member 10, the thinner the sealer holding member 10 is, the more preferable it is. However, a certain thickness or more is required in view of forming a groove for holding the sealer 4 and the strength as a holding member.

On the other hand, in processes using a separation membrane, a cost down is demanded as a system, and one of the goals to be achieved is an increase in the housed membrane area per one element. For this purpose, it is necessary to increase the charged volume of the membrane leaves, so that there is a need to reduce the restriction imposed by the members put to use.

SUMMARY OF THE INVENTION

Thus, an object of the present invention is to provide a sealer holding member for a membrane element that can increase the housed membrane area per one element, as well as a membrane element using the same.

The aforementioned object can be achieved by the present invention such as described below.

Namely, a sealer holding member for a membrane element according to the present invention is a sealer holding member for a membrane element being disposed at an end of a spiral-type membrane element for holding an annular sealer on an outer circumference thereof and allowing a feed to flow into a membrane end of the membrane element, comprising:

a first annular portion having a side wall that opposes an upstream-side membrane end of said membrane element and receiving insertion of an end of an outer-covering member of the membrane element on an outside thereof;

an annular projection formed on an upstream side of the first annular portion, which is capable of stopping an end surface of said outer-covering member and a downstream-side end of said sealer by engagement on two side walls thereof;

a second annular portion formed on an upstream side of the annular projection, which holds said sealer on an outside thereof; and a third annular portion formed on an upstream side of the second annular portion, which is capable of stopping an upstream-side end of said sealer by engagement.

According to the sealer holding member of the present invention, the first annular portion has a side wall that opposes the upstream-side membrane end of the membrane element, and does not have a structure such that the membrane end is inserted in the inside, so that the diameter of the membrane part (wound body) can be increased. Also, the outer-covering member can be inserted and fixed onto the first annular portion, and the sealer can be inserted and held on the second annular portion. Therefore, the length of the membrane part in the axial direction can be increased by reducing the width (thickness) of the remaining annular projection and third annular portion. As a result of this, the housed membrane area per one element can be increased.

In the above, it is preferable that an outer diameter of said third annular portion is smaller than an outer diameter of said annular projection. By this structure, the gap between the third annular portion and the vessel is widened. Therefore, when a sealer having a U-shaped or V-shaped cross section is used, the sealer can receive the flow or pressure of the feed more easily, and the sealing function can be exhibited with more certainty in a state in which the sealing member is widened and extended toward the outside.

Also, it is preferable that, with respect to width in a direction parallel to an axial direction of the membrane element, a width of said annular projection is smaller than a width of said second annular portion, and a width of said third annular portion is smaller than a width of said second annular portion. By this structure, the length of the membrane part in the axial direction can be increased to increase the housed membrane area by reducing the width of the other portions while ensuring the groove for holding the sealer.

In addition, it is preferable that said third annular portion includes a plurality of outer circumferential grooves with a partially lowered outer circumferential surface or a plurality of cut-outs with a partially removed annular portion. With this structure, the gap between the third annular portion and the vessel is partially widened. Therefore, when a sealer having a U-shaped or V-shaped cross section is used, the sealer can receive the flow or pressure of the feed more easily, and the sealing function can be exhibited with more certainty in a state in which the sealing member is widened and extended toward the outside.

Further, it is preferable that an end surface of said third annular portion includes a plurality of end surface grooves extending from an inner circumference thereof to an outer circumference thereof. When a plurality of membrane elements are to be connected, the conventional structure raises a problem in that, the liquid is less likely to escape during discharging the liquid in the membrane element, for example, in cleaning, because the end surfaces thereof are in close adhesion with each other. However, by providing a plurality of end surface grooves, the liquid in the inside can be smoothly discharged (This also applies to the above-described case in which a plurality of cut-outs with a removed annular portion are provided). Furthermore, when a sudden change in pressure is applied, a large pressure difference is generated between the inside and the outside of the outer-covering member of the membrane element, leading to a fear of destruction of the membrane element. However, with this structure of the present invention, the pressure extends smoothly to the outside of the element via the provided end surface grooves, thereby eliminating this fear.

In the meantime, a membrane element of the present invention is constructed in such a manner that any one of the above-described sealer holding members for the membrane element is disposed on an upstream side of the upstream-side membrane end of the spiral-type membrane element, and the end of the outer-covering member is inserted on an outside of said first annular portion. According to the membrane element of the present invention, since the sealer holding member of the present invention is used, the membrane element can have an increased housed membrane area per one element, as provided by the above-described functions and effects.

BRIEF DESCRIPTION OF THE DRAWINGS

FIGS. 2a to 2c are views illustrating one example of a sealer holding member for a membrane element according to the present invention, where

FIGS. 6a to 6c are views illustrating another example of a sealer holding member for a membrane element according to the present invention, where

FIGS. 7a and 7b are views illustrating another example of a sealer holding member for a membrane element according to the present invention, where

DESCRIPTION OF THE PREFERRED EMBODIMENTS

Figure 1:
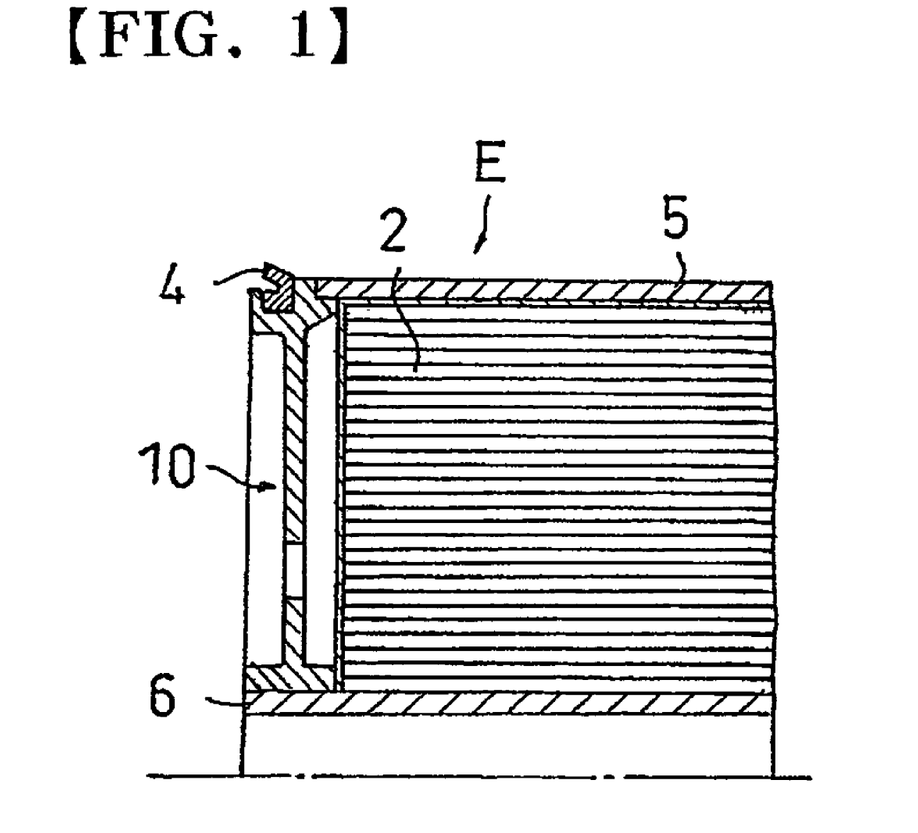
FIG. 1 is a half cross-sectional view illustrating one example of an attachment state of a sealer holding member for a membrane element according to the present invention.

Hereafter, preferred embodiments of the present invention will be described with reference to the attached drawings. FIG. 1 is a half cross-sectional view illustrating one example of an attachment state of a sealer holding member for a membrane element according to the present invention. FIGS. 2a to 2c are views illustrating one example of a sealer holding member for a membrane element according to the present invention, where FIG. 2a is a left side view; FIG. 2b is a cross-sectional arrow view cut along the line I—I; and FIG. 2c is a right side view.

Referring to FIG. 1, the sealer holding member of the present invention is disposed at an end of a spiral-type membrane element E for holding an annular sealer on an outer circumference thereof, and allows a feed to flow into a membrane end of the membrane element E. On the other hand, the membrane element of the present invention is constructed in such a manner that the sealer holding member 10 of the present invention is disposed on the upstream side of the upstream-side membrane end of the spiral-type membrane element E, and the end of the outer-covering member 5 is inserted onto the outside of the first annular portion 11.

The membrane element E may be any type as long as it is one referred to as a spiral-type membrane element. For example, the membrane part thereof is constructed with a wound body 2 where membrane leaves made of a lamination of a supply-side spacer, a separation membrane, and a permeation-side spacer are wound around a central tube (water-collection tube 6). Further, the membrane element E has a sealing structure that prevents the feed from flowing from the supply-side passageway directly to the permeation-side passageway. By this structure, the feed that has flown into the membrane element E is separated by the separation membrane while flowing toward the downstream side along the supply-side spacer of the element E. The permeate that has been permeated through the separation membrane flows along the permeation-side spacer and is collected into the water-collection tube 6.

The sealer 4 is held by the sealer holding member 10 that is attached to an end of the membrane element E. The sealer 4 may have a cross sectional shape of a circular, elliptical, quadrangular cross section, or the like shape; however, in the present invention, a sealer 4 having a shape with an opened part such as a U-shaped, V-shaped, open-box-shaped, or a C-shaped cross section is suitably used. The sealer 4 is preferably made of an elastic material such as rubber, elastomer, or resin. The sealer 4 having a U-shaped or V-shaped cross section widens and extends toward the outside by a pressure at the time of receiving a water stream. In this state, the sealer 4 can seal the gap between the element E and the vessel 1.

The outer-covering member 5 may have a structure such that, for example, a tape or sheet made of a fiber reinforced resin is wound directly around the membrane element E. The end of the outer-covering member 5 is preferably fixed to the first annular portion 11 of the sealer holding member 10 by adhesion bonding or the like.

The water-collection tube 6 has a plurality of holes at a suitable interval, and is formed of resin or the like. The upstream-side end of the water-collection tube 6 is usually closed with a plug or the like in order to prevent the feed from flowing in.

Figure 2:
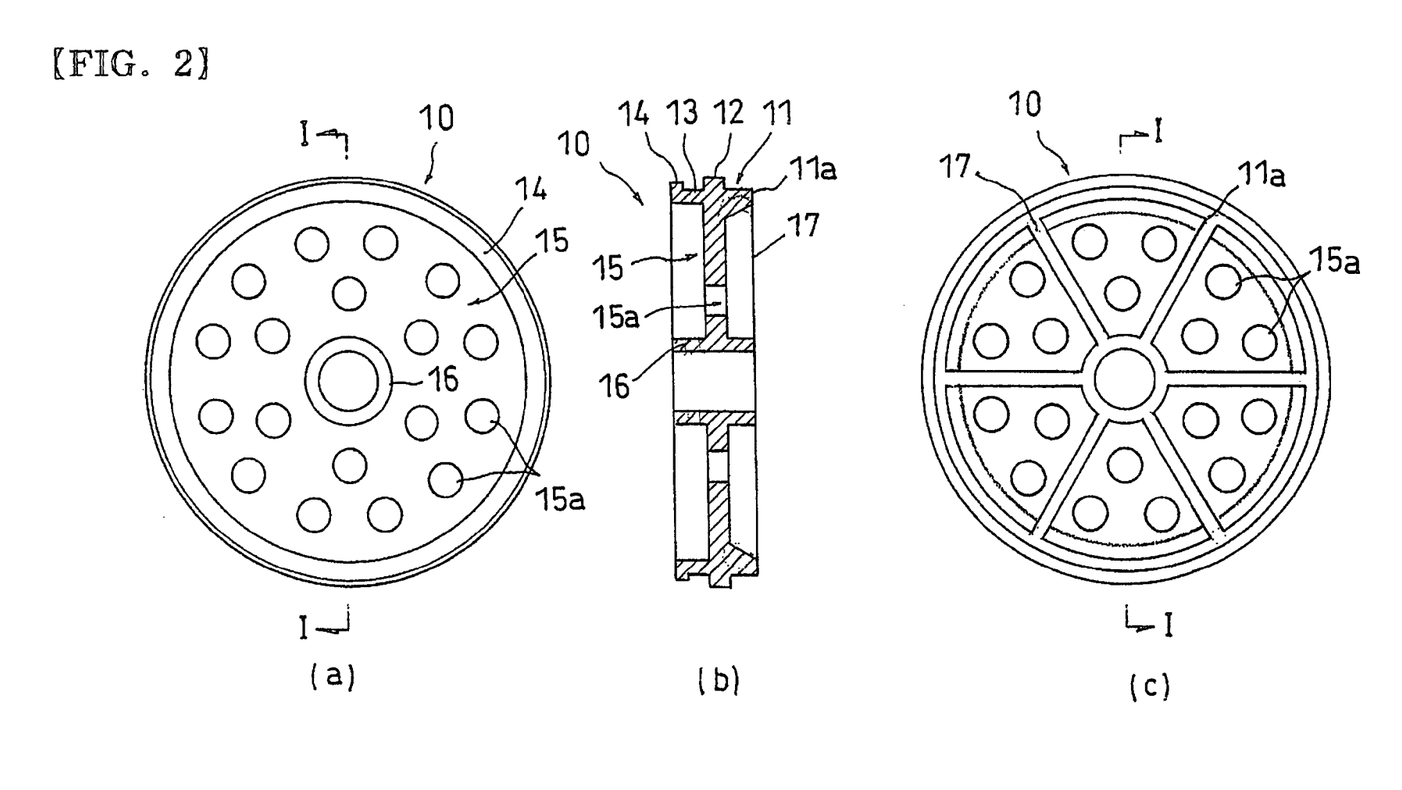
FIG. 2a is a left side view.
FIG. 2b is a cross-sectional arrow view cut along the line I—I.
FIG. 2c is a right side view.

Referring to FIG. 2, the sealer holding member of the present invention includes a first annular portion 11, an annular projection 12, a second annular portion 13, and a third annular portion 14. A first annular portion 11 has a side wall 11a that opposes an upstream-side membrane end of the membrane element E, and receives insertion of an end of an outer-covering member 5 of the membrane element E on an outside thereof. An annular projection 12 is formed on an upstream side of the first annular portion 11 and is capable of stopping an end surface of the outer-covering member 5 and a downstream-side end surface of the sealer 4 by engagement on two side walls thereof. A second annular portion 13 is formed on an upstream side of the annular projection 12 and receives insertion of the sealer 4 on an outside thereof. A third annular portion 14 is formed on an upstream side of the second annular portion 13 and is capable of stopping an upstream-side end surface of the sealer by engagement. Thus, the sealer holding member of the present invention has a structure of being free from a skirt portion for fitting the wound body 2 of the membrane leaves.

With respect to the dimension, which is the width in a direction parallel to an axial direction of the membrane element E, of each of the above-described portions, a width of the annular projection 12 is preferably smaller than a width of the second annular portion 13. Also a width of the third annular portion 14 is preferably smaller than a width of the second annular portion 13.

More specifically, it is preferable that the width of the first annular portion 11 is 5 to 8 mm; the width of the annular projection 12 is 3 to 5 mm; the width of the second annular portion 13 is 7 to 9 mm; and the width of the third annular portion 14 is 3 to 5 mm. With such a dimension of each portion, the total width (thickness) of the sealer holding member can be set to be 15 to 30 mm while ensuring a groove for mounting the sealer 4 and a margin (overlap) for bonding the outer-covering member 5.

In the present invention, the outer diameter of the third annular portion 14 is preferably smaller than the outer diameter of the annular projection 12. With this structure, the upstream side of the groove for holding the sealer 4 will be lower, whereby the sealer 4 can receive the water stream more easily.

In this embodiment, an example will be shown that is provided with an opened plate 15 having a plurality of openings 15a as a structure for allowing the feed to flow into the membrane end of the membrane element E. When the opened plate 15 is adopted, the flow rate distribution of the feed that flows into the membrane part of the membrane element E can be controlled more easily by the size, arrangement, formed density, or the like of the openings 15a. However, the present invention is not limited to this structure, and may have any structure such as having radially extending spokes instead of the opened plate 15.

A cylindrical portion 16 is preferably disposed at the center of the above-mentioned opened plate 15. The sealer holding member is disposed in a state in which the water-collection tube 6 is inserted in this cylindrical portion 16. The water-collection tube 6 may be fixed to the cylindrical portion 16 by adhesive bonding or the like.

In the example shown in FIG. 1, the upstream-side end of the water-collection tube 6 is disposed to be flush (coplanar) with the side wall of the third annular portion 14 of the sealer holding member 10, and the upstream-side end of the cylindrical portion 16 can be positioned more to the downstream side thereof. However, by disposing the upstream-side end of the water-collection tube 6 to be more to the downstream side (opened plate side) of the side wall of the third annular portion 14, the length of the wound body 2 constituting the membrane part can be increased relatively to the water-collection tube 6.

Radially extending ribs 17 are formed on the membrane element side of the opened plate 15. By these ribs 17 reinforcing the opened plate 15, the combined sum of the widths of the two can be reduced.

The sealer holding member 10 can be formed by a known method such as injection molding using a thermoplastic resin, a thermosetting resin, a heat-resisting resin, or the like.

(Other Embodiments)

Hereafter, other embodiments of the present invention will be described.

Figure 3:
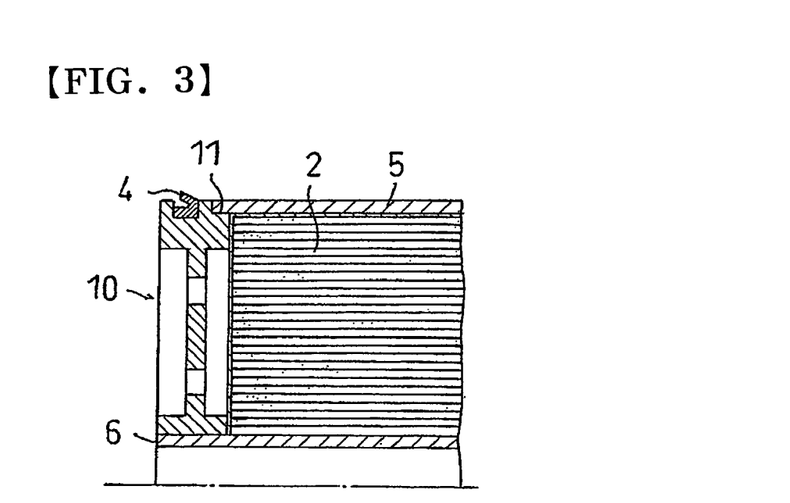
FIG. 3 is a half cross-sectional view illustrating another example of a sealer holding member for a membrane element according to the present invention.

(1) In the above-described embodiment, an example has been shown that attains the minimum thickness of the sealer holding member for a membrane element. However, referring to FIG. 3, a structure may be provided such that the first annular portion 11 is formed by removing the skirt from a conventional sealer holding member. This structure eliminates the need for housing the wound body 2 of the membrane leaves in the inside of the skirt, so that a membrane leaf wound body 2 having a larger diameter than the conventional one can be housed therein.

Figure 4:
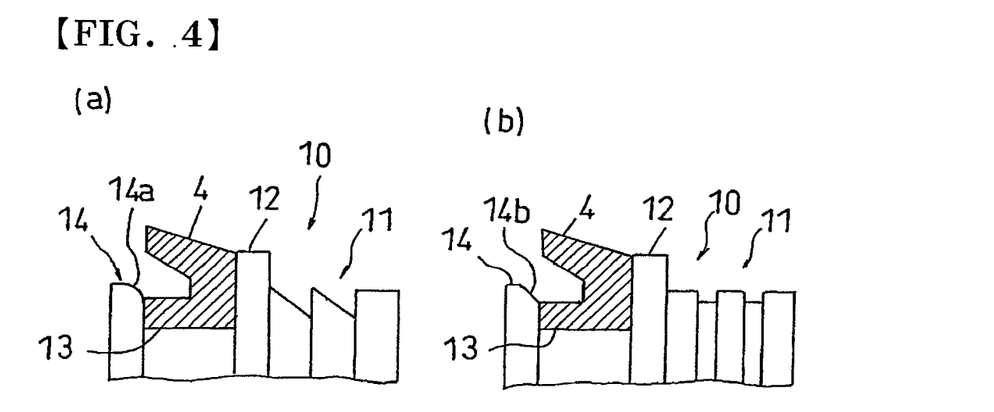
FIGS. 4a to 4b is a view of an essential part illustrating another example of a sealer holding member for a membrane element according to the present invention.
Figure 5:
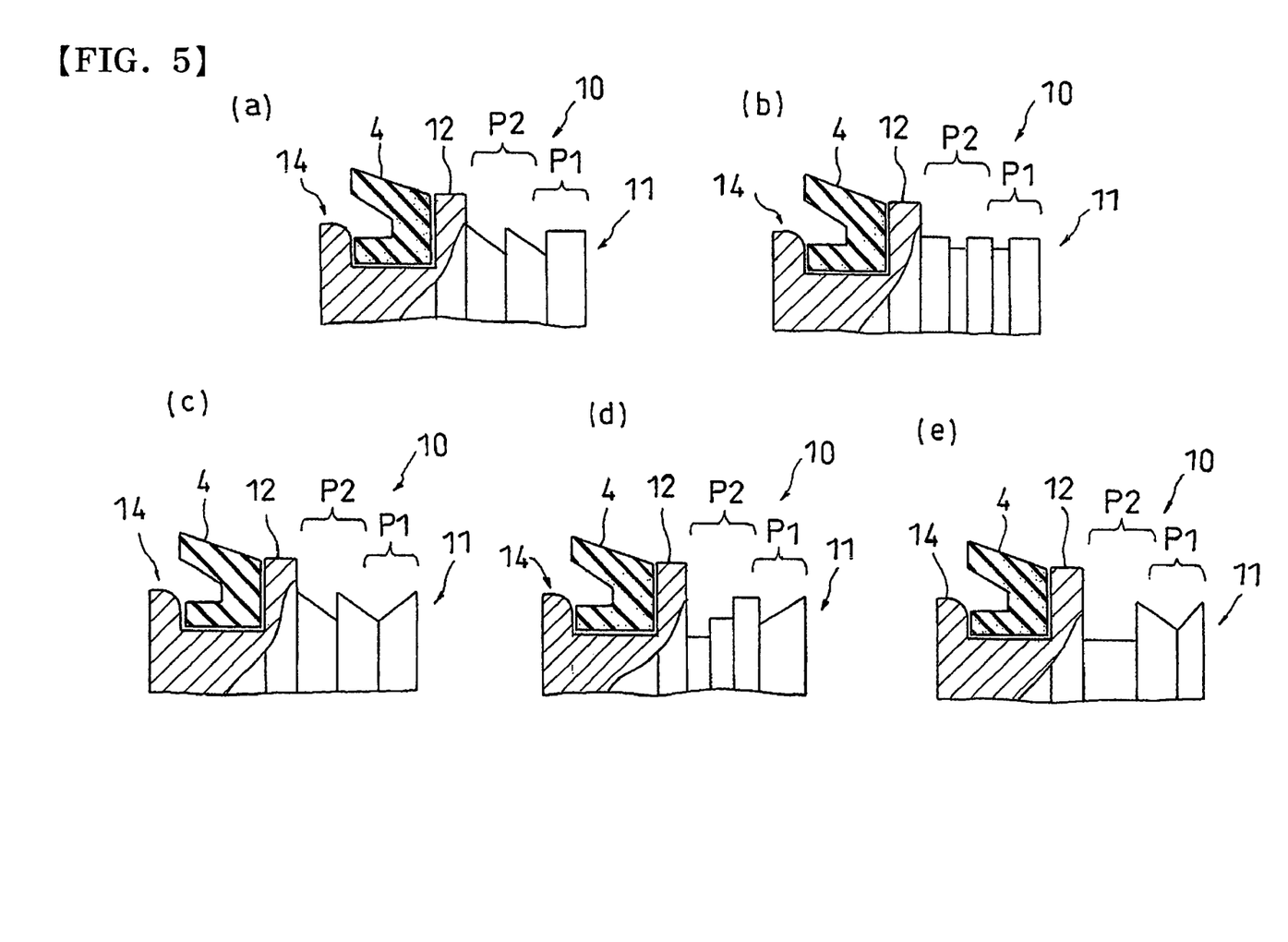
FIGS. 5a to 5e is a half cross-sectional view illustrating another example of a sealer holding member for a membrane element according to the present invention.

(2) Referring to FIGS. 4a to 4b, in the present invention, the width of the second annular portion 13 corresponding to the width of the groove for holding the sealer 4 is preferably close to the thickness of the sealer 4 in order to reduce the total thickness of the sealer holding member. In this case, it is preferable that, while providing a smaller height of the third annular portion 14 on the upstream side in order to prevent closure of the water stream to the sealer 4, the third annular portion 14 is provided with a tapered surface so that the sealer 4 can receive the water stream more easily. The tapered surface may be, for example, a tapered surface 14a having a curved cross section or a tapered surface 14b having a linear cross section.

(3) Referring to FIGS. 4a to 4b, in the present invention, the first annular portion 11 corresponding to the portion for bonding the outer-covering member 5 preferably has grooves, cut-outs, or roughened surface formed therein in order to increase the bonding strength.

Also, referring to FIGS. 5a to 5e, the first annular portion 11 is preferably provided with a site P1 for fixing the wound body 2 to the sealer holding member 10 and a site P2 for fixing the outer-covering member 5 to the sealer holding member 10. The margin of the first annular portion 11 for bonding to the outer-covering member 5 has a function of firmly bonding and holding the outer-covering member 5 to the sealer holding member 10. Also, in applying the outer-covering member 5, an adhesive tape, a glass cloth, or the like is wound and fixed at the portion that abuts against the wound body 2. In addition to fixation, it is needed in order to prevent the resin from flowing from the abutting portion to the wound body end surface.

Further, referring to FIGS. 5a to 5e, the site for fixing the sealer holding member 10 is preferably provided with a step difference or a taper that deepens in the annular projection direction so that the adhesive tape or the like may not slip off. Also, the site for bonding and holding the outer-covering member is preferably provided with a step difference so as not to generate shift in the bonding portion in the shear direction, so as to provide a structure of holding against the pulling and separating force.

Figure 6:
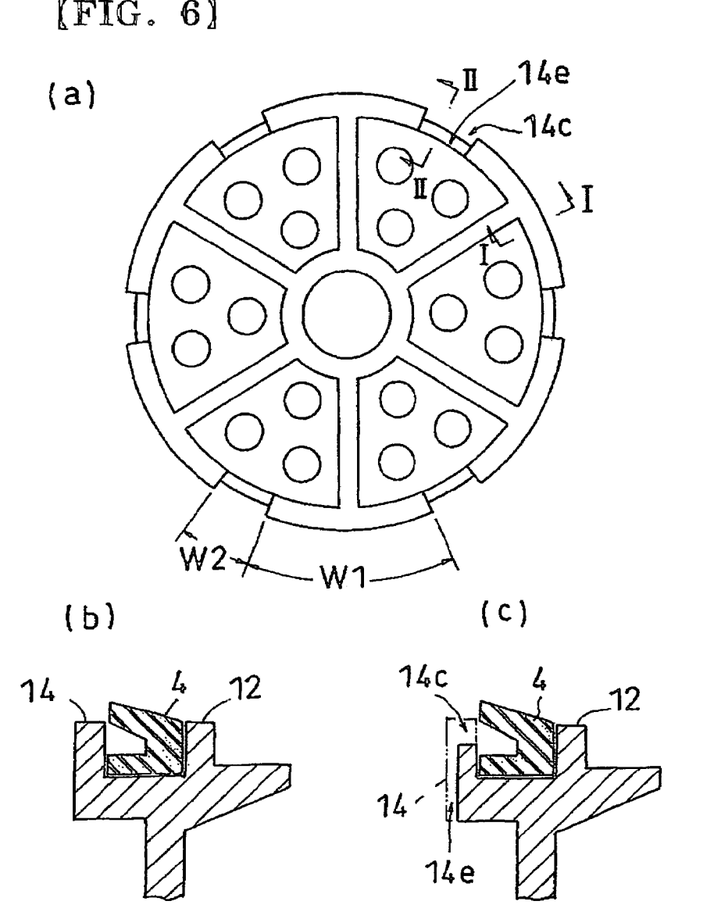
FIG. 6a is a left side view.
FIG. 6b is a cross-sectional view cut along the line I—I.
FIG. 6c is a cross-sectional view cut along the line II—II.
Figure 7:
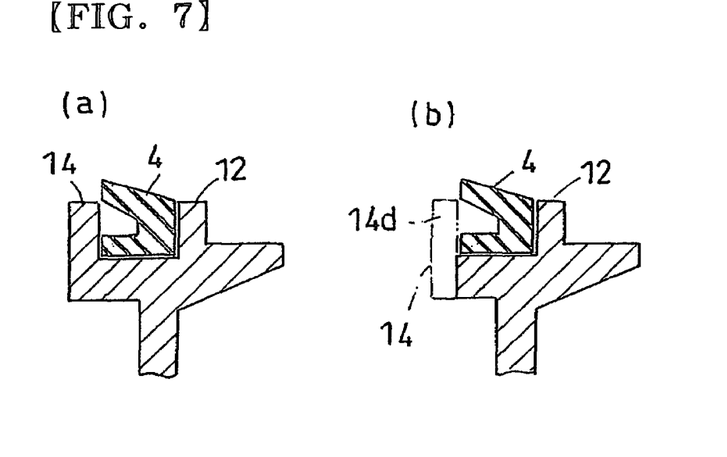
FIG. 7a is a view corresponding to FIG. 6b.
FIG. 7b is a view corresponding to FIG. 6c.

(4) Referring to FIGS. 6a to 6c, in the present invention, the third annular portion 14 may include a plurality of outer circumferential grooves 14c with a partially lowered outer circumferential surface. Also, referring to FIGS. 7a to 7b, in the present invention, the third annular portion 14 may include a plurality of cut-outs 14d with a partially removed annular portion. The depth of the outer circumferential grooves 14c is preferably 0.5 to 3 mm. The number of provided outer circumferential grooves 14c is preferably 4 or more, more preferably 6 to 16.

(5) On the other hand, referring to FIGS. 6a to 6c, in the present invention, an end surface of the third annular portion 14 may include a plurality of end surface grooves 14e extending from an inner circumference thereof to an outer circumference thereof. The cut-outs 14d of the third annular portion 14 shown in FIG. 7b also has a function as end surface grooves extending from the inner circumference thereof to the outer circumference thereof. Preferably, 4 or more, more preferably 6 to 16 end surface grooves 14e are disposed radially at an equal interval in order to let the water in the inside and outside of the membrane element go forth smoothly.

In order that the protrusions and recesses of the end surface grooves 14e may not overlap at the site of connection of the membrane element, it is preferable that, assuming the width W1 of the end surface between the grooves to be 1, the width W2 of the end surface grooves 14e is 0.9 or smaller relative to the width W1.

EXAMPLES

Hereafter, Examples and others for specifically showing the constructions and effects of the present invention will be described.

Example 1

A sealer holding member shown in FIGS. 1 to 2 was fabricated. At that time, the sealer holding member has no skirt, with the total thickness (same as the thickness from an abutting portion of the wound body end surface): 20 mm, the outer-covering member bonding margin: 6 mm, the sealer groove width: 8 mm, the sealer groove depth: 6.5 mm, and the upstream-side side wall height of the sealer grooves: 3.5 mm.

Comparative Example 1

Figure 8:
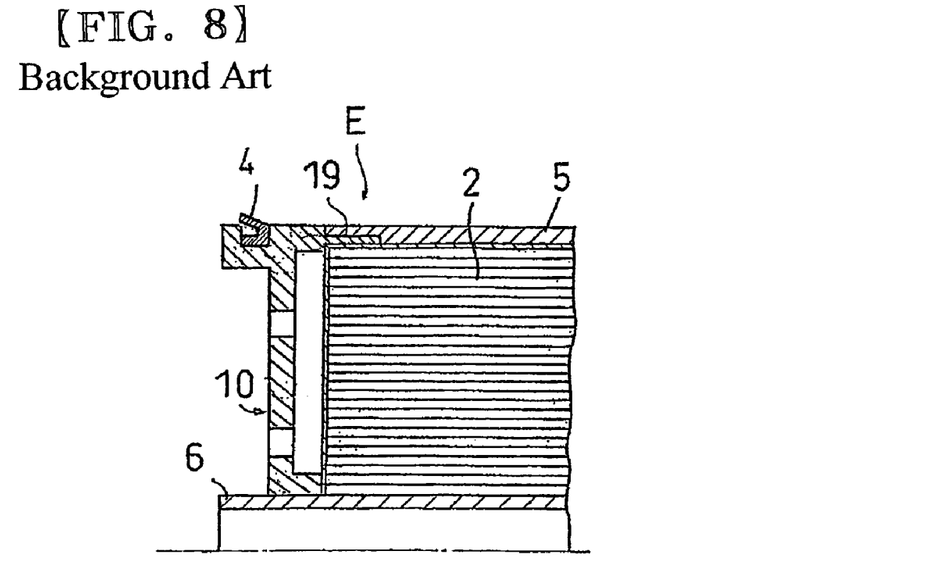
FIG. 8 is a half cross-sectional view illustrating an example of a conventional sealer holding member for a membrane element.

A conventional sealer holding member shown in FIG. 8 was fabricated. At that time, the sealer holding member has a skirt having an inner diameter of 194 mmφ, with the total thickness: 48 mm, the thickness from the wound body end surface abutting portion: 37 mm, the outer-covering member bonding margin (including the skirt portion): 27 mm, the sealer groove width: 9 mm, the sealer groove depth: 6.5 mm, and the upstream-side side wall height being the same as the downstream-side side wall height (same as the depth).

Example of Producing an Element

Spiral-type membrane elements were fabricated using the sealer holding members of Example 1 and Comparative Example 1. The spiral-type membrane elements were fabricated using membrane leaf constituting members each having the same thickness. One leaf was constituted of a unit in which a membrane leaf having a length of 1480 mm was double-folded with a supply-side spacer sandwiched in between. The leaves were wound around a water-collection tube together with a permeation-side spacer. The results of comparing the two elements are shown in Table 1.

The wound body having 33 leaves had a diameter of 197 mmφ, and could not be housed within the conventional sealer holding member of Comparative Example 1; on the other hand, the wound body could be disposed in the sealer holding member of Example 1 of the present invention. The element using the conventional sealer holding member had 31 leaves. Thus, the number of membrane leaves increased by two. Also, the membrane leaf width increased by 37 mm as compared with the conventional one, and the membrane area effective for practical processing increased by 4.2 m$^2$.

TABLE 1

|  | Example 1 | Comparative Example 1 |
|---|---|---|
| Number of membrane leaves (leaves) | 33 | 31 |
| Wound body diameter (mmφ) | 197 | 189 |
| Membrane leaf width (mm) | 975 | 938 |
| Used membrane area (m$^2$) | 47.6 | 43.0 |
| Effective membrane area (m$^2$) | 41.7 | 37.5 |

What is claimed is:

1. A sealer holding structure for a spiral-type membrane element, comprising:
   (i) the spiral-type membrane element having an upstream end and a side circumference, said spiral-type membrane element being disposed inside an outer vessel;
   (ii) an outer-cover member that covers the side circumference of the membrane element and extends in an upstream direction from the upstream end of the membrane element;
   (iii) an annular sealer for sealing a space between the spiral-type membrane element and the outer vessel at the upstream end of the membrane element; and
   (iv) a sealer holding member for holding the annular sealer comprising a first annular portion, an annular projection, a second annular portion, and a third annular portion, wherein
   the first annular portion is engaged with an inner wall of the outer-cover member without contacting the side circumference of the membrane element;
   the annular projection stops an end of the outer-covering member; and
   the third annular portion is a second annular projection, and the second annular portion is defined between the annular projection and the third annular portion where the annular sealer is fitted, wherein the third annular portion includes a plurality of outer circumferential grooves with a partially lowered outer circumferential surface or a plurality of cut-outs with a partially removed annular portion.

2. A sealer holding structure for a spiral-type membrane element, comprising:
(i) the spiral-type membrane element having an upstream end and a side circumference, said spiral-type membrane element being disposed inside an outer vessel; (
ii) an outer-cover member that covers the side circumference of the membrane element and extends in an upstream direction from the upstream end of the membrane element;
(iii) an annular sealer for sealing a space between the spiral-type membrane element and the outer vessel at the upstream end of the membrane element; and
(iv) a sealer holding member for holding the annular sealer comprising a first annular portion, an annular projection, a second annular portion, and a third annular portion, wherein
the first annular portion is engaged with an inner wall of the outer-cover member without contacting the side circumference of the membrane element;
the annular projection stops an end of the outer-covering member; and
the third annular portion is a second annular projection, and the second annular portion is defined between the annular projection and the third annular portion where the annular sealer is fitted,
wherein the third annular portion includes a plurality of end surface grooves extending from an inner circumference of the third annular portion to an outer circumference of said third annular portion.

3. The sealer holding structure according to claim 1, wherein the first annular portion has a convex-concave side where the outer-cover member is engaged.

4. The sealer holding structure according to claim 1, wherein the third annular portion has an inclined surface facing the annular sealer.

5. The sealer holding structure according to claim 1, wherein the sealer holding member has reinforcing ribs radially extending from an inner cylindrical portion toward an outer periphery of the sealer holding member.

6. The sealer holding structure according to claim 2, wherein the first annular portion has a convex-concave side where the outer-cover member is engaged.

7. The sealer holding structure according to claim 2, wherein the third annular portion has an inclined surface facing the annular sealer.

8. The sealer holding structure according to claim 2, wherein the sealer holding member has reinforcing ribs radially extending from an inner cylindrical portion toward an outer periphery of the sealer holding member.

9. The sealer holding structure according to claim 1, wherein the third annular portion has an outer diameter which is smaller than that of the annular projection.

10. The sealer holding structure according to claim 2, wherein the third annular portion has an outer diameter which is smaller than that of the annular projection.

11. The sealer holding structure according to claim 1, wherein each of the annular projection and the third annular portion has a width defined in an axial direction which is smaller than that of the second annular portion.

12. The sealer holding structure according to claim 2, wherein each of the annular projection and the third annular portion has a width defined in an axial direction which is smaller than that of the second annular portion.

13. The sealer holding structure according to claim 1, wherein the first annular portion comprises a site for fixing a wound body to the sealer holding member.

14. The sealer holding structure according to claim 2, wherein the first annular portion comprises a site for fixing a wound body to the sealer holding member.

15. The sealer holding structure according to claim 13, further comprising an adhesive tape or glass cloth, which is wound and fixed at the portion of the outer-covering member that abuts against the wound body.

16. The sealer holding structure according to claim 14, further comprising an adhesive tape or glass cloth, which is wound and fixed at the portion of the outer-covering member that abuts against the wound body.

17. The sealer holding structure according to claim 1, wherein the first annular portion comprises a step difference or taper that deepens in the annular projection direction.

18. The sealer holding structure according to claim 2, wherein the first annular portion comprises a step difference or taper that deepens in the annular projection direction.

19. The sealer holding structure according to claim 1, wherein the depth of the outer circumferential grooves is 0.5 to 0.3 mm.

20. The sealer holding structure according to claim 2, wherein the depth of the end surface grooves is 0.5 to 0.3 mm.

21. The sealer holding structure according to claim 1, comprising 4 or more grooves.

22. The sealer holding structure according to claim 2, comprising 4 or more grooves.

23. The sealer holding structure according to claim 1, comprising 6 to 16 grooves.

24. The sealer holding structure according to claim 2, comprising 6 to 16 grooves.

25. The sealer holding structure according to claim 1, wherein the ratio of width of end surface between grooves to width of end surface grooves is 0.9 or less.

26. The sealer holding structure according to claim 2, wherein the ratio of width of end surface between grooves to width of end surface grooves is 0.9 or less.

* * * * *